Feb. 25, 1964     E. W. HENDERSON     3,122,419
PROCESS AND APPARATUS FOR PREPARING OIL FEED
Filed Dec. 1, 1961
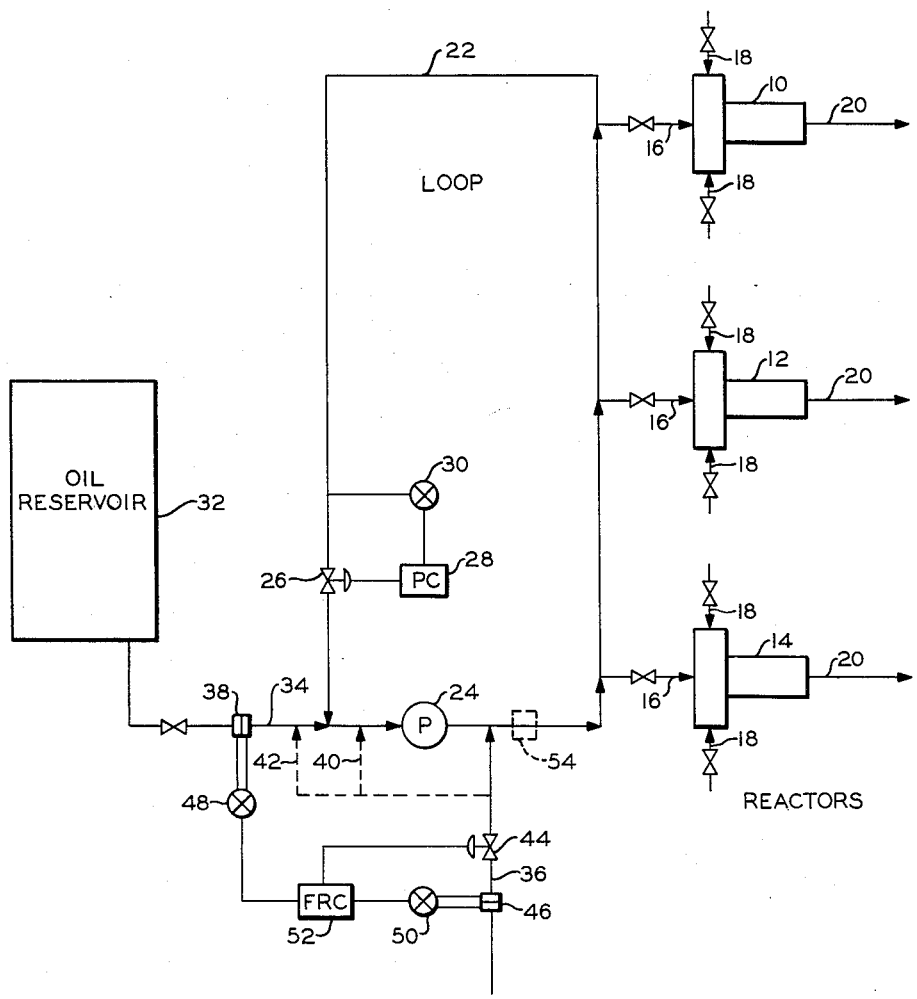
*INVENTOR.*
E. W. HENDERSON
BY *Young & Quigg*
ATTORNEYS

3,122,419
PROCESS AND APPARATUS FOR PREPARING OIL FEED

Eulas W. Henderson, Phillips, Tex., assignor to Phillips Petroleum Company, a corporation of Delaware
Filed Dec. 1, 1961, Ser. No. 156,264
17 Claims. (Cl. 23—209.4)

This invention relates to a process and apparatus for incorporaing relatively oil-insoluble compounds in an oil feed for a series of carbon black furnaces.

The carbon black industry utilizes various oil feed stocks which are converted in carbon black furnaces or reactors to carbon black. It is sometimes advantageous to incorporate in the oil feed certain additives which have a beneficial effect upon the carbon black or upon rubber into which the carbon black is compounded. An additive which has recently come into use is a salt or other compound of an alkali metal. Compounds of this type are usually added in an amount which provides the alkali metal in a concentration in the range of about 10 to 20,000 parts by weight per million parts by weight of carbon black produced. One such compound is KCl which is relatively insoluble in the oil, or only slightly soluble, so that it is impossible to dissolve a sufficient quantity of this compound in the oil to effect the desired result on the carbon black product.

This invention is concerned with a method and arrangement of apparatus for incorporating an additive or metal compound in an oil feed to a series of carbon black reactors.

Accordingly, it is an object of the invention to provide a process or method and an arrangement of apparatus for incorporating in an oil feed to a series of carbon black reactors a minor concentration of an additive, such as a metal compound. Another object is to provide a method of control and a control system for incorporating an aqueous emulsion in an oil stream to provide a fixed concentration of a constituent of the emulsion. A further object is to provide a method and apparatus for injecting a solution of a metal compound, such as an alkali metal salt solution into an oil loop feeding a plurality of reactors. Other objects of the invention will become apparent to one skilled in the art upon consideration of the accompanying disclosure.

A broad aspect of the invention comprises feeding a plurality of carbon black reactors from a loop which is connected by a supply line to an oil reservoir and injecting into the loop or the supply line leading to the loop a liquid carrying a desired additive to the oil feed. The flow rate of oil thru the supply line leading into the loop is sensed and the injection of liquid into the system downstream of the sensing point is controlled in response to the sensed flow rate so as to provide a predetermined ratio of oil to liquid additive. Injecting the liquid into the loop or into the supply line leading to the loop below the flow rate sensing point assures adequate distribution of the liquid in the oil because of the mixing action of the pump in the loop and the reasonably rapid circulation of the oil-liquid additive mixture thru the loop.

When the desired additive is a solid compound it is dissolved in a suitable liquid which may or may not be oil soluble. In many cases an aqueous solution is used, such as KCl dissolved in water.

It is feasible and advantageous to incorporate in the aqueous solution of the desired compound and emulsifying agent and forming an emulsion before injecting same into the oil. Potassium stearate is particularly effective since it adds to the total potassium in the oil; however, other suitable emulsifiers may be utilized. Examples of the emulsifiers include metal stearates such as those of sodium and potassium, octoates, alcohols, ethers, glycols, etc. Isopropyl alcohol has been found to work reasonably well. Metal stearates, naphthenates, etc., which are oil soluble when used as the additive per se, may be dissolved in an oil compatible with the oil feed and injected thereinto as such.

A more complete understanding of the invention may be had by reference to the accompanying schematic drawing which is a plan view of an apparatus illustrating the invention.

Referring to the drawing a series of reactors 10, 12, and 14 each have an oil inlet line 16 and air lines 18. Numeral 20 designates the effluent line from the reactor. Oil inlet line 16 of each reactor connects with loop 22 in which is positioned a pump 24 and a back pressure valve 26. Pressure controller 28 is sensitive to pressure transmitter 30 which senses pressure in the loop upstream of valve 26 and controls the back pressure at a predetermined level by controlling valve 26.

An oil reservoir 32 is connected by an oil supply line 34 with loop 22 just above pump 24. A liquid additive supply line 36 connects with loop 22 adjacent the outlet of pump 24 or it may connect with the loop upstream of pump 24 or with line 34 downstream of orifice 38, as shown by dotted lines 40 and 42, respectively.

The control system includes a motor valve 44 positioned in line 36, an orifice or flow meter 46 in line 36, flow transmitters 48 and 50, and flow ratio controller 52 which is sensitive to the signals from flow transmitters 48 and 50 and is in control of motor valve 44. Transmitter 48 transmits a signal proportional to the rate of flow in line 34 which is received by flow ratio controller 52. This instrument also receives a signal from transmitter 50 which is proportional to the flow rate of liquid or solution in line 36. The set point on instrument 52 provides a fixed ratio of flow in line 34 to flow in line 36 and, when the flow increases in line 34, flow ratio controller 52 resets valve 44 so as to provide the set ratio of flow of oil to flow of liquid or solution.

When utilizing a solution which is not readily dispersible in the oil it is feasible to utilize a suitable mixer, such as a homogenizer, just downstream of line 36 as at 54.

The amount of solution or emulsion to be introduced, i.e., the ratio of flow of oil in line 34 to flow of solution in line 36, will depend upon the concentration of the metal compound in the solution and the amount of the compound or metal desired in the carbon black produced in the reactors.

The following example illustrates the invention but is not to be construed as unnecessarily limiting the same.

Example

In a system such as that shown in the drawing, incorporation of K in the black is effected by injecting into the loop downstream of pump 24, a 20% aqueous solution of KCl (10% by weight of K). Eight reactors receive feed from the loop at an average rate of approximately 2,000 lbs. per hour or a total flow thru line 34 of 16,000 lbs. per hour. The flow rate of oil in line 34 is sensed and instrument 52 controls valve 44 to admit 4 lbs. per hour of solution thru line 36 to provide a concentration of about 25 p.p.m. of K in the oil feed. As one or more reactors are shut down for any reason, the flow of oil in line 34 is decreased and the controls make a proportional reduction in the injection of KCl. The action of pump 24 provides adequate dispersion of the solution in the oil by circulating thru the loop an excess of about 50% of the oil passing to the reactors.

In a system using an individual flow meter on the line to each reactor, control of solution injection is provided by installing an integrator which computes the total flow and feeds a signal to instrument 52, proportional to total flow.

The use of an oil-soluble metal compound dissolved in a hydrocarbon, such as potassium naphthenate dissolved in diesel oil, is within the scope of the invention. When using this type of solution, a 10% by weight concentration requires about 0.002 lb. of solution per lb. of oil.

The system and method of the invention facilitates changing the concentration of the compound incorporated in the oil at any time desired, as when the character of the oil feed in reservoir 32 is changed, or when the characteristics of the carbon black are to be changed in accordance with the characteristics of the rubber into which the carbon black is to be compounded are to be changed or modified; e.g., when changing the process from the production of one type of black to another type the concentration of K in the black is changed to suit the desired characteristics of the black. This system has advantages over incorporating the desired compound in the oil feed in reservoir 32 for this reason. Also, it is more difficult if not impossible to maintain uniform concentration of an additive of this nature in the reservoir oil so that the stream passing from the reservoir to the loop contains a uniform concentration of the additive. By circulating the oil and solution thru the loop and thru the pump, proper distribution of the addtive is maintained so that the concentration of the additive in the carbon black product is substantially constant.

Certain modifications of the invention will become apparent to those skilled in the art and the illustrative details disclosed are not to be construed as imposing unnecessary limitations on the invention.

I claim:

1. A process for incorporating a minor concentration of a liquid containing a desired additive into the oil feed to a plurality of reactors which comprises the steps of
   (1) continuously passing liquid oil feed to a closed feed loop from a storage tank and circulating said oil feed thru said loop;
   (2) passing said oil feed from said loop in individual streams to a plurality of carbon black reactors to form carbon black therein;
   (3) sensing the flow rate of oil feed from said tank to said loop;
   (4) incorporating a desired minor concentration of a liquid additive in the oil feed in said loop by continuously passing said liquid additive into said oil feed at a point downstream of said tank and upstream of said reactors at a rate in response to the sensed flow rate of said oil feed from said storage tank to said loop to provide said desired concentration; and
   (5) maintaining a back pressure in the liquid in said loop upstream of the point of introduction of feed to said loop and downstream of said reactors.

2. The process of claim 1 wherein said additive is a solid compound and said liquid additive is an aqueous solution thereof.

3. The process of claim 2 wherein an emulsifier is added to said aqueous solution to form an emulsion before injecting same into said loop.

4. The process of claim 2 wherein said emulsifier comprises a metal stearate.

5. The process of claim 4 wherein said metal stearate is an alkali metal stearate.

6. The process of claim 4 wherein said additive is KCl and said metal stearate is potassium stearate.

7. The process of claim 1 wherein said liquid additive is a solution of an alkali metal compound.

8. The process of claim 7 wherein said compound is KCl.

9. The process of claim 1 wherein said liquid additive is an aqueous solution of KCl.

10. The process of claim 1 wherein said liquid additive is an oil solution of a metal compound.

11. The process of claim 7 wherein said metal is potassium.

12. The process of claim 7 wherein said metal is an organo-potassium compound.

13. The process of claim 1 wherein said liquid additive is an oil solution of potassium naphthenate.

14. Apparatus comprising in combination a plurality of carbon black reactors each having an inlet oil feed line; an oil supply system comprising a closed oil feed loop connecting with each said inlet oil feed line having pump means therein for circulating oil therethru and back pressure means therein upstream of the hereinafter named oil supply line; an oil supply line connecting with said loop; an oil reservoir connected with said oil supply line; a solution line connecting with said system downstream of said oil reservoir and upstream of said reactors; a flow control valve in said solution line; and means for sensing the rate of flow of oil in said oil supply line and controlling said valve in response thereto to proportion the rate of flow of solution to the rate of flow of oil to said loop.

15. The apparatus of claim 14 wherein said solution line connects with said loop adjacent the downstream side of said pump.

16. The apparatus of claim 14 wherein said solution line connects with said loop adjacent the upstream side of said pump.

17. The apparatus of claim 14 wherein last said means comprises a first flow transmitter sensitive to flow in said oil supply line upstream of the solution inlet point; a second flow transmitter sensitive to the flow in said solution line; and a ratio controller sensitive to said first and said second flow transmitters operatively connected with said valve so as to proportion the rate of flow of solution to the rate of flow of oil to said loop.

References Cited in the file of this patent

UNITED STATES PATENTS

| | | |
|---|---|---|
| 1,613,438 | Brooks | Jan. 4, 1927 |
| 2,617,714 | Arnold | Nov. 11, 1952 |
| 2,883,271 | Pennington et al. | Apr. 21, 1959 |
| 2,895,805 | Wood et al. | July 21, 1959 |
| 3,010,794 | Friauf et al. | Nov. 28, 1961 |